Feb. 15, 1955 J. B. HICKEY 2,702,372

DELAY LINE

Filed Sept. 16, 1953

INVENTOR.
JAMES B. HICKEY
BY James S. Shannon
AGENT— and
Wade Koontz
ATTORNEY—

United States Patent Office 2,702,372
Patented Feb. 15, 1955

2,702,372

DELAY LINE

James B. Hickey, Camden, N. Y., assignor to the United States of America as represented by the Secretary of the Air Force Application September 16, 1953, Serial No. 380,630

7 Claims. (Cl. 333—29)

(Granted under Title 35, U. S. Code (1952), sec. 266)

The invention described herein may be manufactured and used by or for the Government for governmental purposes without payment to me of any royalty thereon.

This invention relates to electrical delay lines and particularly to delay lines of the lumped parameter L-C low pass *m*-derived filter type.

Objects of the invention are to provide a delay line that occupies very little space; that may be designed for a wide range of delays, characteristic impedances and bandwidths; that provides convenient delay taps; that has high temperature and moisture stability; and that is easy to manufacture and has a high degree of reproducibility.

Briefly the line consists of a plurality of cascaded sections each consisting of a series inductance and a shunt capacitance. The capacitance is provided by a small molded mica condenser which serves as a form around which the series inductance coil is wound. The sections are mounted side by side in rows with the axes of the coils perpendicular to a base plate through which the ground leads of the condensers are passed. The other leads of the condensers serve as delay taps. Adjacent coils are wound in opposite directions so as to provide positive coupling therebetween. By properly proportioning this coupling an *m*-derived filter having a phase shift proportional to frequency is obtained.

A more detailed description of the invention will be given in connection with a specific embodiment thereof shown in the accompanying drawings, in which Fig. 1 shows an assembled delay line in accordance with the invention;

Figs. 2 and 2*a* show one of the delay units that compose the delay line;

Figure 1:
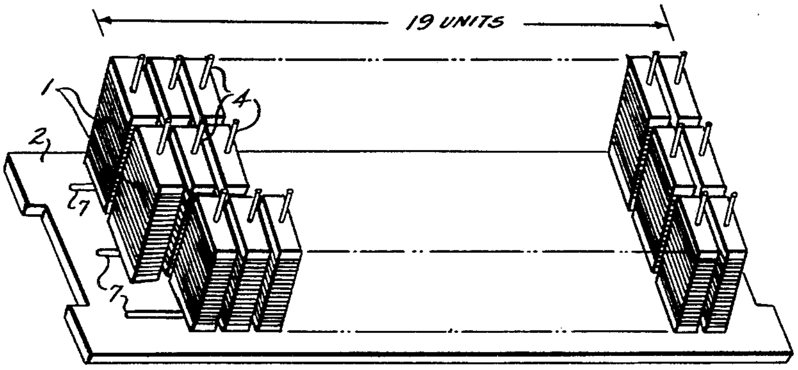
Figure 2:
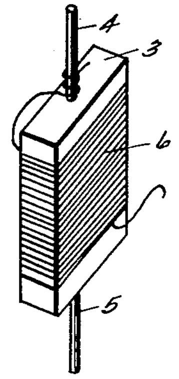
Figure 2A:
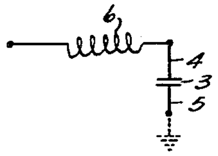

Referring to Fig. 1, the assembled delay line comprises a plurality of sections 1 arranged tightly together in rows on a base plate 2. Each of the sections, as shown in Fig. 2, consists of a molded mica condenser 3, having leads 4 and 5, and a coil of wire 6 wrapped around the condenser body as a form. One end of the coil is attached to the high potential lead 4. The schematic circuit of a section is shown in Fig. 2*a*. The low potential leads 5 of the condenser may be passed through slots 7 in the base plate 1 to facilitate their grounding. If base plate 2 is made of metal these leads may be grounded directly thereto.

Figure 3:
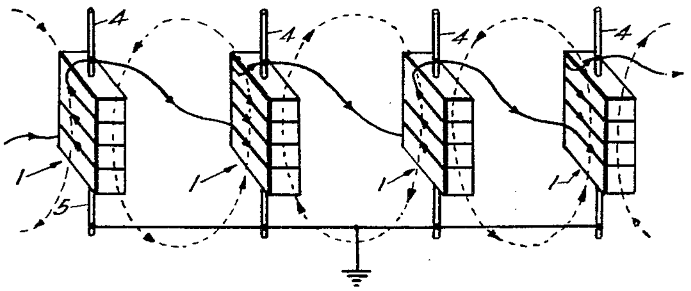
Fig. 3 shows the method of connecting the delay units.

The various sections 1 are connected in cascade in the manner shown in Fig. 3. It will be noted that adjacent coils are wound in opposite directions in order to achieve a positive coupling therebetween. The number of sections used depends upon the maximum delay required. The leads 4 of the condensers serve as convenient delay taps and any desired delay from zero to the maximum value, in steps of the delay per section, may be obtained by connecting to the appropriate tap. The line is terminated in a resistance equal to its characteristic impedance.

Figure 4:
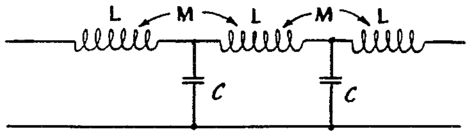
Fig. 4 shows the schematic circuit of the line.
Figure 5:
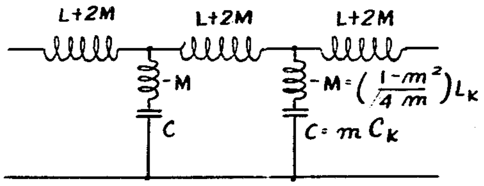
Fig. 5 shows the equivalent *m*-derived filter.

Fig. 4 shows schematically the electric circuit of the delay line. An *m*-derived low pass filter that is the equivalent of the line in Fig. 4 is shown in Fig. 5. The parameters $L_k$ and $C_k$ in this figure are those of the prototype filter section.

The specifications of a typical delay line constructed in accordance with the invention are as follows:

Capacitor 3: 100 mmf. miniature silver mica capacitor;
Coil 6: 150 turns of #38 HF wire, random progressive wound over 11/32" length;
Overall dimensions including base: 4¼" x 1 1/16" x ¾"
Average delay per section: .096 microsecond
Number of sections: 56
Total delay: 5.376 microseconds
Average coil inductance: 0.08 mh.
Approx. $Z_0$: 910 ohms
Coupling between adjacent coils: +12.4%.
Approx. initial bandwidth: 4.0 mc.

Delay lines designed in accordance with the invention are capable of operating with pulses as narrow as ½ microsecond and of producing delays as high as 20 microseconds or more.

The compactness of the line is due largely to the side-by-side arrangement of the inductors which occupies less space than the usual coaxial arrangement using end coupling. The design is versatile in that a wide range of delays, surge impedances and bandwidths may be obtained by changing the value of L, C and M through choice of number of coil turns, physical and electrical condenser size, and physical relation of adjacent coils. Also the moisture and temperature stability of the line is high compared to the usual wire-wound semidistributed types due to the sealed condensers which are not affected by moisture and which also have high temperature stability.

I claim:

1. A delay line comprising a plurality of cascaded sections each consisting of a series inductance and a shunt capacitance, in which the inductance is a coil of wire wrapped around the body of a condenser supplying said capacitance, said sections being mounted close together in a row with the axes of said coils perpendicular to a reference plane whereby inductive coupling exists between adjacent coils.

2. Apparatus as claimed in claim 1 in which the flux directions in adjacent coils are such as to produce positive inductive coupling therebetween.

3. Apparatus as claimed in claim 1 in which adjacent coils are wound in opposite directions.

4. Apparatus as claimed in claim 1 in which the inductive coupling between said coils is positive and of such amount as to result in said line being the equivalent of a plural section *m*-derived low pass filter.

5. A delay line comprising a plurality of cascaded sections each consisting of a series inductance and a shunt capacitance, in which said capacitance is provided by a condenser of the type having a case of molded insulating material and in which said inductance is a coil of wire wrapped on said core as a form, said sections being mounted close together in a row with the axes of said coils perpendicular to a reference plane whereby inductive coupling exists between adjacent coils.

6. Apparatus as claimed in claim 5 in which said condenser case has the exterior form of a substantially rectangular solid.

7. Apparatus as claimed in claim 5 in which adjacent coils are wound in opposite directions to provide positive coupling therebetween and in which the magnitude of said coupling is such as to make said line the equivalent of a plural section *m*-derived low pass filter.

References Cited in the file of this patent

UNITED STATES PATENTS

| | | |
|---|---|---|
| 1,817,443 | Marvel | Aug. 4, 1931 |
| 1,972,268 | Lesh | Sept. 4, 1934 |
| 2,390,563 | Tawney | Dec. 11, 1945 |